Dec. 24, 1940.  J. E. HAINES  2,225,955
AIR CONDITIONING SYSTEM
Filed March 5, 1937
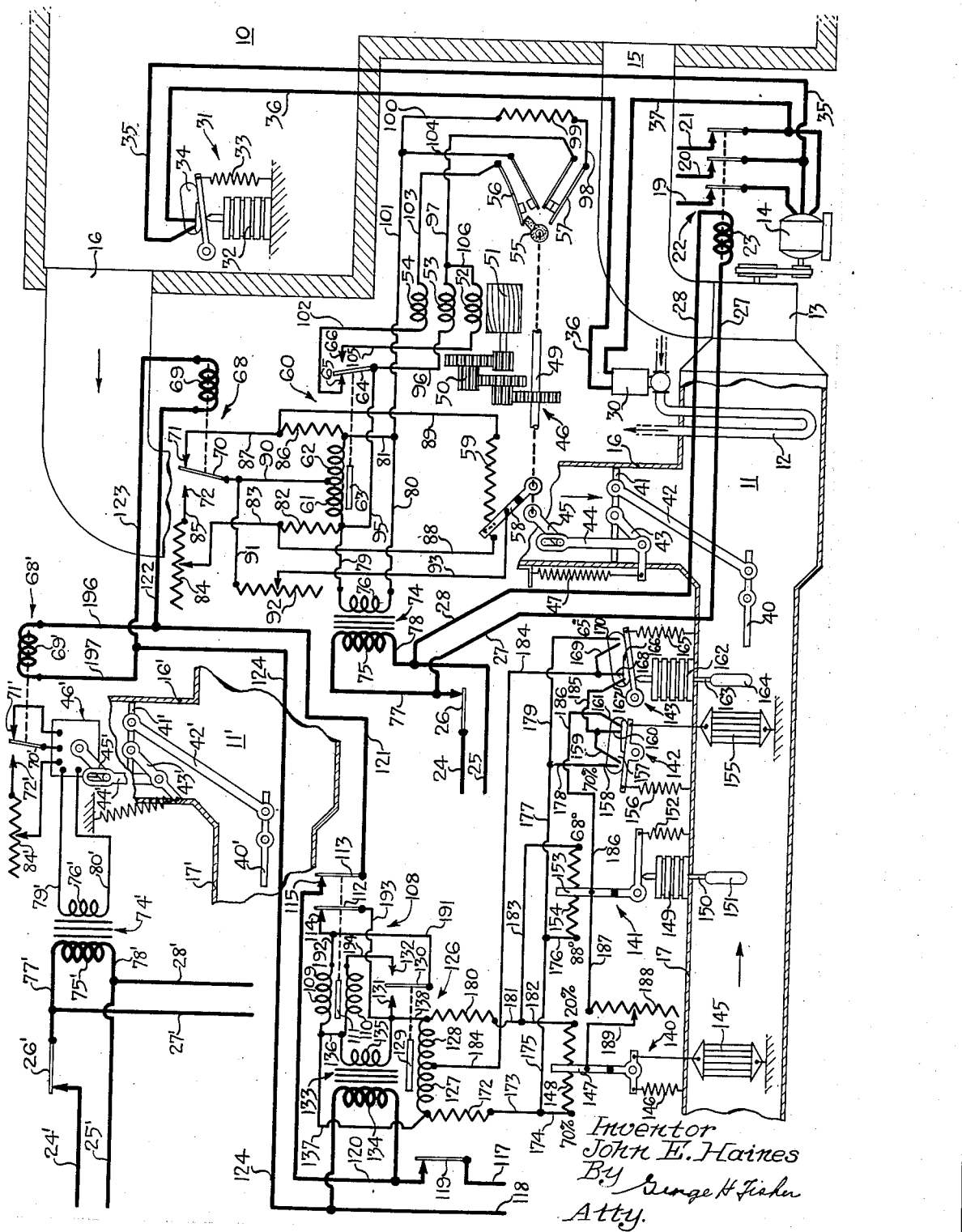
Inventor
John E. Haines
By George H. Fisher
Atty.

Patented Dec. 24, 1940

2,225,955

UNITED STATES PATENT OFFICE 2,225,955

AIR CONDITIONING SYSTEM

John E. Haines, Minneapolis, Minn., assignor to Minneapolis-Honeywell Regulator Company, Minneapolis, Minn., a corporation of Delaware Application March 5, 1937, Serial No. 129,207

17 Claims. (Cl. 236—44)

This invention relates to air conditioning systems in general and more particularly to the control of fresh air and recirculated air supplied to an air conditioning unit.

Air conditioning or cooling systems in general take outside air or re-circulated air or a mixture of both, cool this air and deliver it to an inclosure to maintain the temperature and relative humidity of the enclosure at desired values. In cooling this air a certain percentage of the total heat of the air is removed. If the total heat of the outside air or the re-circulated air or the mixture of both being delivered to the air conditioning unit is relatively high, a relatively large amount of cooling is required to maintain desired conditions in the enclosure. On the other hand, if the total heat of the air supplied to the air conditioning unit is relatively low, less cooling of the air delivered to the enclosures is required. It follows then that it is more economical to select air with the least amount of total heat for delivery to the air conditioning unit. If the total heat of the outdoor air is less than the total heat of the re-circulated air, outdoor air should be utilized for air conditioning purposes. If, on the other hand, the total heat of the outdoor air is more than the total heat of the re-circulated air, re-circulated air should be utilized for air conditioning purposes. Total heat of air may be measured in accordance with wet bulb temperature and therefore if the outdoor wet bulb temperature is less than the re-circulated air wet bulb temperature, outdoor air should be utilized and conversely, re-circulated air should be utilized when the wet bulb temperature of the re-circulated air is less than the wet bulb temperature of the outside air.

It is found that the return or re-circulated air of practically all air conditioning systems has a substantially constant wet bulb temperature under practically all conditions. Since the re-circulated air wet bulb temperature is substantially constant, a control means responsive solely to the condition of the outdoor air may be utilized for determining whether outside air or re-circulated air should be delivered to the air conditioning unit depending upon whether the wet bulb temperature of the outdoor air is above or below a predetermined value, such as 63° for example.

It is therefore the primary object of this invention to measure the outdoor wet bulb temperature and control the fresh air and return air dampers of an air conditioning system in accordance with this outdoor wet bulb temperature so that substantially all return air will be utilized when the outdoor wet bulb temperature is above a given value and to utilize substantially all fresh air when the outdoor wet bulb temperature is below a predetermined value.

The specific manner for accomplishing this mode of operation also forms objects of this invention.

It is also an object of this invention to provide a fresh air damper control of the type specified with a high limit relative humidity control to utilize substantially all return air when the outdoor relative humidity rises above a predetermined high value.

Still another object of this invention is to provide an outdoor dry bulb temperature low limit control so that substantially all return air will be utilized in case the outdoor dry bulb temperature decreases below a given value.

Still another object of this invention is to provide a control system of the type specified wherein the closing movement of the fresh air damper is limited so that the supply of a minimum amount of fresh air is at all times assured to satisfy ventilation requirements. In addition, it is also an object of this invention to provide a means for completely closing the fresh air damper at will.

A further object of this invention is to utilize a single set of controls as specified for controlling the admission of outside and return air to a plurality of air conditioning units whereby installation and upkeep costs are materially reduced.

Other objects and advantages of this invention will become apparent to those skilled in the art upon reference to the accompanying specification, claims and drawing.

For a further understanding of this invention reference is made to the accompanying single sheet of drawing in which is diagrammatically disclosed the preferred form of this invention.

Reference numeral 10 designates a space or building to be conditioned. An air conditioning unit for cooling air to be delivered to the space 10 is designated at 11 and may include a cooling coil 12. Air is drawn from the air conditioning unit 11 by a fan 13 driven by a fan motor 14 and discharged through a supply duct 15 into the space or building to be conditioned. Return air is withdrawn from the space 10 by a return air duct 16 entering the air conditioning unit 11. Fresh air is supplied to the air conditioning unit 11 by means of a fresh air duct 17.

Power is supplied to the fan motor 14 from line wires 19, 20 and 21, and the supply of power to the fan motor 14 is controlled by a magnetic starter 22 having an operating coil 23. Power is supplied to the operating coil 23 of the magnetic starter 22 from line wires 24 and 25 under the control of a switch 26. When the switch 26 is closed a circuit is completed from the line wire 24 through switch 26, wire 27, operating coil 23, and wire 28 back to the other line wire 25. Completion of this circuit pulls in the magnetic starter and causes operation of the fan motor 14 and consequently the fan 13.

The supply of cooling fluid to the cooling coil 12 may be controlled by a solenoid valve 30. The solenoid valve 30 may be controlled in any suitable manner but for purposes of illustration it is shown as being controlled by a room thermostat generally designated at 31. The room thermostat 31 may comprise a bellows 32 containing a volatile fluid and operating a mercury switch 34 against the action of a tension spring 33. By suitably adjusting the tension of the spring 33 the temperature setting of the thermostat 31 may be adjusted. Upon an increase in space temperature to a predetermined value the switch 34 is moved to a closed position to complete a circuit from one of the wires leading to the fan motor 14 through wire 35, mercury switch 34, wire 36, solenoid valve 30 and wire 37 back to another wire supplying power to the fan 14. As a result the solenoid valve 30 is opened to supply cooling fluid to the cooling coil 12 to reduce the space temperature. When the space temperature decreases below the predetermined value the mercury switch 34 is moved to an open position to break the circuit through the solenoid valve 30 whereupon the supply of cooling fluid to the cooling coil 12 is shut off. In this manner a constant temperature may be maintained within the space 10. Since the supply of power to the solenoid valve 30 is taken from the fan motor circuit it is impossible to open the solenoid valve 30 unless the fan motor 14 is operating.

The supply of fresh air to the air conditioning chamber 11 is controlled by a fresh air damper 40 and the supply of return air to the air conditioning chamber 11 may be controlled by a return air damper 41. These dampers 40 and 41 may be connected together by a link 42 so that as the fresh air damper 40 is moved to a closed position the return air damper 41 is moved to an open position and vice versa. The dampers 40 and 41 are operated through a crank arm 43, a link 44 and a crank arm 45 by a proportioning motor 46 of the spring return or power failure type shown and described in Patent No. 2,032,658 granted to W. H. Gille on March 3, 1936. A spring 47 connected to the link 44 tends at all times to urge the dampers 40 and 41 to a position wherein the damper 40 is closed and the damper 41 is open.

The proportioning motor 46 may comprise a shaft 49 which operates the crank arm 45 driven through a reduction gear train 50 by a motor rotor 51. The motor rotor 51 is controlled by three field windings 52, 53 and 54. The field winding 53 operates as a holding winding and has sufficient power to maintain the proportioning motor 16 in any of its adjusted positions against the action of the spring 47. The field winding 54 when energized along with the field winding 53 overcomes the spring 47 to move the damper 40 towards an open position and the damper 41 towards a closed position. Field winding 52 is a bucking winding and when energized along with field winding 53, the holding action of the field winding 53 is neutralized and the spring 47 moves the proportioning motor 56 in a direction to close the fresh air damper 40 and open the return air damper 41. If the supply of power to the three windings 52, 53 and 54 is interrupted the spring 47 will move the proportioning motor 46 to a position wherein the damper 40 is completely closed and the damper 41 is wide open. The shaft 49 also operates an abutment member 55 which is adapted to open limit switches 56 and 57 when the proportioning motor 46 is moved into either extreme position. The shaft 49 also operates a slider 58 with respect to a resistance element 59. The slider 58 and the resistance element 59 form a balancing potentiometer.

Proportioning motor 46 also includes a relay generally designated at 60. This relay comprises relay coils 61 and 62 for operating an armature 63. The armature 63 operates a switch arm 64 with respect to contacts 65 and 66. When the relay coil 61 is energized more than the relay coil 62, the switch arm 64 is moved into engagement with contact 65 and when the relay coil 62 is energized more than relay coil 61, the switch arm 64 is moved into engagement with contact 66. When the relay coils 61 and 62 are equally energized the switch arm 64 is maintained spaced midway between the contacts 65 and 66.

Relay 60 is controlled by another relay generally designated at 68. This relay includes a relay coil 69 for operating a switch arm 70 with respect to contacts 71 and 72. When the relay coil 69 is energized the switch arm 70 engages contact 71 and when the relay coil 69 is deenergized switch arm 70 engages contact 72.

Power is supplied to the relay 60 by means of a step-down transformer 74 having a primary 75 and a secondary 76. One end of the primary 75 is connected by a wire 77 to the switch 26 and the other end is connected by a wire 78 to the line wire 25. Therefore, when the switch 26 is closed the primary 75 is connected across the line wires 24 and 25 and the transformer 74 is energized. One end of the secondary 76 is connected by a wire 79 to the left end of the relay coil 61 and the other end of the secondary 76 is connected by wires 80 and 81 to the right end of the relay coil 62. The other ends of the relay coils 61 and 62 are connected together and therefore the relay coils 61 and 62 are connected in series and across the secondary 76. The left end of the relay coil 61 is connected by a protective resistance 82, a wire 83, a variable resistance 84 and a wire 85 to the contact 72 of relay 68. The right end of the relay coil 62 is connected by a protective resistance 86 and a wire 87 to the contact 71. The ends of the balancing potentiometer resistance element 59 are connected by wires 88 and 89 to the protective resistances 82 and 86 respectively. The junction of the relay coils 61 and 62 is connected by a wire 90 to the switch arm 70 of the relay 68 and by wires 90 and 91, variable resistance 92 and wire 93 to the slider 58 of the balancing potentiometer.

A holding circuit is completed through the field winding 53 of the proportioning motor 56, this circuit being traced from the secondary 76 through wires 79, 95, 96, field winding 53, wire 97, limit switch 57, wire 98, resistance 99 and wires 100, 101 and 80 back to the secondary 76. Completion of this circuit energizes the field winding 53 to maintain the proportioning motor 46 in its adjusted position. Assume now that the relay coil 69 of the relay 68 is energized so as to move the switch arm 70 into engagement with the contact 71. By reason of the above wiring connections the relay coil 62 is substantially completely short-circuited to decrease the energization thereof and increase the energization of the relay coil 61 whereupon the switch arm 64 engages contact 65. This completes a circuit from the secondary 76 through wires 79 and 95, switch arm 64, contact 65, wire 102, field winding 54, wire 103, limit switch 56 and wires 104, 101 and 80 back to the secondary 76. Both field windings 53 and 54 are energized to overcome the spring 47 and move the fresh air damper toward an open position and the return air damper 41 toward a closed position. This movement of the proportioning motor 46 also causes left-hand movement of the slider 58 to tend to rebalance the energizations of the relay coils 61 and 62. But since the relay coil 62 is substantially completely short-circuited the proportioning motor will be moved to an extreme position to open wide the damper 40 and close completely the damper 41.

When the relay coil 69 of the relay 68 becomes deenergized the switch arm 70 engages the contact 72 to partially short-circuit the relay coil 61 to decrease the energization thereof and increase the energization of the relay coil 62. Since the variable resistance 84 is in series with the contact 72 the relay coil 61 will not be completely short-circuited. The switch arm 64 is moved into engagement with the contact 66 to complete a circuit from the secondary 76 through wires 79 and 95, switch arm 64, contact 66, wire 105, field winding 52, wires 106 and 97, limit switch 57, wire 98, resistance 99 and wires 100, 101 and 80 back to the secondary 76. Completion of this circuit energizes the field winding 52 and since the field winding 53 is also energized the holding action of the field winding 53 is neutralized and the spring 47 operates the proportioning motor 46 in the opposite direction to move the fresh air damper 40 towards a closed position and the return air damper 41 towards an open position. Movement of the proportioning motor 46 in this manner also causes right-hand movement of the slider 58 of the balancing potentiometer and when the slider 58 has moved sufficiently far to the right to rebalance the energizations of the relay coils 61 and 62 the switch arm 64 is moved out of engagement with the contact 65. This breaks the circuit through the bucking winding 52 and further operation of the proportioning motor 46 is arrested.

In this manner the proportioning motor 46 is operated to a position depending upon the resistance value of the resistance 84. By suitably adjusting the resistance value of the resistance 84 the minimum open position of the fresh air damper 40 may be adjusted. It follows then that when the relay 68 is pulled in the fresh air damper 40 is moved to a wide open position and the return air damper 41 is completely closed. When the relay 68 drops out the fresh air damper 40 is moved to a minimum open position and the return air damper 41 is moved to a corresponding open position, the positions of the dampers 40 and 41 being determined by the resistance value of the variable resistance 84. Therefore, this provides a means for admitting at all times a minimum amount of fresh air to the air conditioning unit 11 in order to satisfy ventilating requirements. If the switch 26 is opened the supply of power to the proportioning motor 46 is interrupted and the spring 47 completely closes the fresh air damper 40 and opens wide the return air damper 41. Since the switch 26 also controls the operation of the fan 13, the fresh air damper 40 is completely closed when the fan 13 is stopped when the switch 26 is opened.

The relay 68 is in turn controlled by a relay 108 having an energizing coil 109 and a bucking coil 110. The two coils 109 and 110 control the operation of an armature 111. The armature 111 operates switch arms 112 and 113 with respect to contacts 114 and 115 respectively. When the relay coil 109 is energized the switch arms 112 and 113 are moved into engagement with the contacts 114 and 115. When the relay coils 109 and 110 are simultaneously energized or when neither relay coil 109 and 110 is energized, the switch arms 112 and 113 are moved out of engagement with contacts 114 and 115 by means of springs, gravity or other means (not shown).

Power is supplied to the relay 68 by line wires 117 and 118. When the relay 108 pulls in so as to move switch arm 113 into engagement with contact 115 a circuit is completed from the line wire 117 through switch 119, wire 120, contact 115, switch arm 113, wires 121 and 122, relay coil 69 and wires 123 and 124 back to the other line wire 118. Therefore, when the relay 108 pulls in, the relay 68 is pulled in to operate the fresh air damper 40 to a wide open position and the return air damper 41 to a completely closed position. Opening of the switch 119 interrupts the supply of power to the relay 68 so that the relay 68 drops out, this moving the fresh air damper 40 to a minimum open position and the return air damper 41 to a corresponding position.

The relay 108 is controlled by a relay generally designated at 126 and this relay may comprise series connected relay coils 127 and 128 for influencing an armature 129. The armature 129 operates a switch arm 130 with respect to spaced contacts 131 and 132. When the relay coil 127 is energized more than the relay coil 128, the switch arm 130 is moved into engagement with the contact 131 and when the relay coil 128 is energized more than the relay coil 127, the switch arm 130 is moved into engagement with the contact 132. When the relay coils 127 and 128 are equally energized the switch arm 130 assumes a position spaced midway between the contacts 131 and 132. Power is supplied to the relays 108 and 126 by a step-down transformer 133 having a primary 134 and a secondary 135. The primary 134 is connected across the line wires 117 and 118 when the switch 119 is closed. One end of the secondary 135 is connected by wires 136 and 137 to the left end of the relay coil 127 and the other end of the secondary 135 is connected by a wire 138 to the right end of the relay coil 128. Therefore, the relay coils 127 and 128 are connected across the secondary 135 of the step-down transformer 133.

The relay 126 is controlled by a potentiometer type humidity responsive controller 140, a potentiometer type temperature responsive controller 141, an on and off type humidity responsive controller 142 and an on and off type temperature responsive controller 143. Although for purposes of illustration I have disclosed each of these controllers as being separate instruments it is conceivable that the two humidity responsive controllers may be combined into one instrument and likewise the two temperature responsive controllers may be combined into one instrument. The humidity responsive controllers and the temperature responsive controllers have their controlling elements located in the fresh air duct 17 so that these instruments respond to dry bulb temperature and relative humidity of the outdoor air.

The humidity responsive controller 140 may comprise a humidity responsive element 145 operating against the action of a spring 146 to move a slider 147 with respect to a resistance element 148. The slider 147 and the resistance element 148 form a control potentiometer. Upon an increase in outdoor relative humidity the slider 147 is moved to the left and upon a decrease it is moved to the right. For purposes of illustration it is assumed that the slider 147 is moved to the extreme left-hand position when the outdoor relative humidity is 70%, and to the extreme right-hand position when the outdoor relative humidity is 20%. The temperature responsive controller 141 may comprise a bellows 149 connected by a capillary tube 150 to a bulb 151 located in the fresh air duct 17. The bulb 151 contains a volatile fluid and therefore the bellows 149 expands and contracts in accordance with variations in outdoor temperatures. The bellows 149 operates against the action of a spring 152 to move a slider 153 with respect to a resistance element 154. The slider 153 and the resistance element 154 form a control potentiometer. Upon an increase in outdoor dry bulb temperature the slider 153 moves to the left and upon a decrease it moves to the right. For purposes of illustration it is assumed that the slider 53 is moved to the extreme left position when the outdoor dry bulb temperature reaches 88° and is moved to the extreme right position when the outdoor dry bulb temperature decreases to 68°.

The on and off type humidity responsive controller 142 comprises a humidity responsive element 155 acting against a spring 156 for operating a mercury switch 157. The mercury switch 157 is provided with left electrodes 158 and 159 and right electrodes 160 and 161. The inner electrodes 159 and 160 are connected together. Normally the mercury of the mercury switch 157 bridges the electrodes 160 and 161 but when the outdoor relative humidity rises to 70% the mercury bridges the electrodes 158 and 159. The on and off type temperature responsive controller 143 may comprise a bellows 162 connected by a capillary tube 163 to a bulb 164 containing a volatile fluid and located in the fresh air duct 17. The bellows 162 operates against the action of the tension spring 165 to move a mercury switch 166. The mercury switch 166 is provided with left electrodes 167 and 168 and right electrodes 169 and 170. The inner electrodes 168 and 169 are connected together. Normally the mercury in the mercury switch 166 bridges the electrodes 167 and 168 but when the outdoor dry bulb temperature decreases to 65° the mercury bridges the electrodes 169 and 170.

The left end of the relay coil 127 is connected by a protective resistance 172 and wires 173, 174, 175 and 176 to the left ends of the resistance elements 148 and 154. The left end of the relay coil 127 is also connected by wires 177, 178 and 179 to the electrode 158 of the humidity responsive controller 142 and to the electrode 170 of the temperature responsive controller 143. The right end of the relay coil 128 is connected by a protective resistance 180 and wires 181, 182 and 183 to the right ends of the resistance elements 148 and 154. The junction of the relay coils 127 and 128 is connected by a wire 184 to the two inner electrodes 168 and 169 of the mercury switch 163. The left electrode 167 of the mercury switch 166 is connected by a wire 185 to the two inner electrodes 159 and 160 of the mercury switch 157. The right electrode 161 of the mercury switch 157 is connected by a wire 186 to the slider 153 of the temperature responsive controller 141. The slider 153 is in turn connected by a wire 187, a variable resistance 188 and a wire 189 to the slider 147 of the humidity responsive controller 140.

With the parts in the position shown in the drawing and particularly with the mercury switches 157 and 166 in the positions shown, it is seen that the control potentiometer of the humidity responsive controller 140 and the control potentiometer of the temperature responsive controller 141 are connected in parallel with the series connected relay coils 127 and 128 and across the secondary 135. The slider 147 is in a position indicating a relative humidity of 45%, and the slider 153 is in a position indicating a dry bulb temperature of 78°. By referring to a standard psychometric chart it is seen that a dry bulb temperature of 78° and a relative humidity value of 45% indicates a wet bulb temperature of substantially 63°. It is also noted that a relative humidity of 70% and a dry bulb temperature of 68° gives a wet bulb temperature of substantially 63° and further that a relative humidity of 20% and a dry bulb temperature of 88° gives a wet bulb temperature of substantially 63°. For a given dry bulb temperature a decrease in relative humidity denotes a decrease in wet bulb temperature and vice versa an increase in relative humidity denotes an increase in wet bulb temperature. Likewise, for a given relative humidity an increase in dry bulb temperature denotes an increase in wet bulb temperature and a decrease in dry bulb temperature denotes a decrease in wet bulb temperature. By assuming the above limits it is seen that the two control potentiometers actually indicate wet bulb temperatures.

As pointed out above, the sliders 147 and 153 are in a position to indicate a wet bulb temperature of substantially 63°. Upon a decrease in relative humidity or upon a decrease in dry bulb temperature which denotes a decrease in wet bulb temperature the sliders 147 or 153 move to the right to partially short-circuit the relay coil 128 to decrease the energization thereof and increase the energization of the relay coil 127. As a result, the switch arm 130 is moved into engagement with the contact 131 to complete a circuit from the secondary 135 through contact 131, switch arm 130, wires 191 and 192, relay coil 109 and wire 136 back to the secondary 135. Completion of this circuit energizes the relay coil 109 to move switch arms 112 and 113 into engagement with the contacts 114 and 115. As pointed out above, the fresh air damper 40 is thereupon moved to a wide open position and the return air damper 41 is moved to a closed position. Therefore, when the outdoor wet bulb temperature is below 63° the fresh air damper 40 is wide open to admit all outdoor air to the air conditioning unit 11. Movement of the switch arm 112 into engagement with the contact 114 completes a maintaining circuit for the relay coil 109 which may be traced from the secondary 135 through wire 193, switch arm 112, contact 114, wire 192, relay coil 109 and wire 136 back to the secondary 135. This circuit maintains the relay coil 109 energized even though the switch arm 130 shall move out of engagement with the contact 131.

When the wet bulb temperature of the outdoor air increases above 63° either the slider 153 or the slider 147 is moved to the left in response to an increase in dry bulb temperature or an increase in relative humidity to partially short-circuit the relay coil 127 to decrease the energization thereof and increase the energization of the relay coil 128. This causes movement of the switch arm 130 into engagement with the contact 132 to complete a circuit from the secondary 135 through wire 193, switch arm 112, contact 114, wire 191, switch arm 130, contact 132, wire 194 and bucking coil 110 back to the secondary 135. Completion of this circuit energizes the bucking coil 110 to neutralize the action of the energizing coil 109 whereupon the switch arms 112 and 113 are moved out of engagement with their contacts 114 and 115. This drops out the relay 68 to move the fresh air damper 40 to a minimum position and the return air damper to a corresponding maximum position. Therefore, when the outdoor wet bulb temperature is above 63° substantially all of the air delivered to the air conditioning unit is return air except for a small amount of fresh air which is utilized for ventilation purposes. Since, as pointed out above, the return air from the space 10 usually has a wet bulb temperature of about 63° it is more economical to use return air for air conditioning purposes when the outdoor wet bulb temperature is above 63°. But if the outdoor wet bulb temperature is below 63° it is more economical to use outdoor air for air conditioning purposes. As is known, the total amount of heat in the air which must be removed is determined by the wet bulb temperature of the air. The control mechanism of this invention, therefore, provides an automatic means for selecting outdoor air when it is more economical to utilize outdoor air and to select return air when it is more economical to use return air.

If the outdoor relative humidity should increase to 70% the mercury switch 157 is tilted to break the circuit to the sliders 153 and 147 of the potentiometer type controllers whereby these controllers are rendered inoperative to control the control system. Also when the outdoor relative humidity increases to 70% the electrodes 158 and 159 are bridged to substantially completely short-circuit the relay coil 127 which drops out the relays 108 and 68 to move the fresh air damper 40 to a minimum position and the return air damper 41 to a corresponding position. Therefore, even though the wet bulb temperature of the outdoor air is below 63° the fresh air damper 40 is moved to a minimum position so that substantially all return air is utilized in case the outdoor relative humidity should increase above 70%. In other words, a relative humidity high limit control is provided.

If the outdoor temperature should decrease to 65° the mercury switch 166 is tilted to break the circuit to the sliders 153 and 147 of the proportioning type controllers whereby these controllers are rendered inoperative to control the control system. Also the mercury is caused to bridge the contacts 169 and 170 to substantially completely short-circuit the relay coil 127. This drops out the relays 108 and 68 to move the fresh air damper 40 to a minimum open position and the return air damper 41 to a corresponding position. Therefore, even though the outdoor wet bulb temperature is below 63° the fresh air damper 40 is moved to a minimum position when the outdoor dry bulb temperature decreases to 65°. Under these circumstances substantially all return air is utilized when the outdoor dry bulb temperature is below 65°.

By reason of the above arrangement substantially all fresh air is utilized for air conditioning purposes when the outdoor wet bulb temperature is below 63°, when the outdoor relative humidity is below 70%, and when the outdoor dry bulb temperature is above 65°. Under these conditions it is usually more economical to utilize outdoor air for air conditioning purposes than return air. If, however, the wet bulb temperature of the outdoor air should increase above 63° it would be more economical to utilize return air for air conditioning purposes and therefore the fresh air damper 40 is moved to a minimum open position. If the outdoor relative humidity should increase above 70% or if the outdoor dry bulb temperature should decrease below 65° the fresh air damper 40 is moved to a minimum open position so that substantially all return air is utilized for air conditioning purposes. In other words, the fresh air damper 40 is controlled by outdoor wet bulb temperature and is safeguarded by a high limit relative humidity control and a low limit dry bulb temperature control.

If it be desired to control a plurality of fresh air dampers for admitting fresh air to a plurality of air conditioning units it is possible to do so with only a single set of controls. A second air conditioning unit generally shown at 11' and since this air conditioning unit and the control equipment associated therewith is exactly the same as the air conditioning unit 11 and its associated equipment, like reference characters primed have been utilized for like parts. Therefore, a further description of this air conditioning unit and its associated mechanism is not required. The fresh air and return air dampers of this second air conditioning unit are controlled by a relay 68', the operating coil 69' thereof being connected in parallel with the operating coils 69 of the relay 68 by wires 196 and 197. Therefore, the relays 68 and 68' are simultaneously pulled in or dropped out in accordance with the outdoor wet bulb temperature. In this manner a single set of controllers may be utilized for controlling a plurality of fresh air and return air dampers.

From the above it is seen that I have provided a novel control arrangement for determining whether fresh air or return air should be utilized for air conditioning purposes. By reason of this invention the most economical mode of operation of an air conditioning system is at all times assured.

Although for purposes of illustration I have shown one form of my invention other forms thereof may become apparent to those skilled in the art upon reference to this specification and therefore this invention is to be limited only by the scope of the appended claims and prior art.

I claim as my invention:

1. In an air conditioning system, the combination of damper means for controlling the supply of outside air to an enclosure, means responsive to outside atmospheric conditions for operating the damper means to a maximum air supplying position when the wet bulb temperature of the outside air is less than a predetermined value and for operating the damper means to a minimum air supplying position when the wet bulb temperature is greater than said predetermined value, and means responsive to a predetermined high relative humidity value of the outside air for operating said damper means to a minimum air supplying position regardless of the wet bulb temperature of the outside air.

2. In an air conditioning system, the combination of damper means for controlling the supply of outside air to an enclosure, means responsive to outside atmospheric conditions for operating the damper means to a maximum air supplying position when the wet bulb temperature of the outside air is less than a predetermined value and for operating the damper means to a minimum air supplying position when the wet bulb temperature is greater than said predetermined value, and means responsive to a predetermined low dry bulb temperature value of the outside air for operating said damper means to a minimum air supplying position regardless of the wet bulb temperature of the outside air.

3. In an air conditioning system, the combination of damper means for controlling the supply of outside air to an enclosure, means responsive to outside atmospheric conditions for operating the damper means to a maximum air supplying position when the wet bulb temperature of the outside air is less than a predetermined value and for operating the damper means to a minimum air supplying position when the wet bulb temperature is greater than said predetermined value, means responsive to a predetermined high relative humidity value of the outside air for operating said damper means to a minimum air supplying position regardless of the wet bulb temperature of the outside, and means responsive to a predetermined low dry bulb temperature value of the outside air for operating said damper means to a minimum air supplying position regardless of the wet bulb temperature of the outside air.

4. In an air conditioning system for a space, an air conditioning chamber for conditioning air to be delivered to the space, means including fan means for delivering outside air into the chamber and for delivering conditioned air to the space, damper means movable between a wide open position and a closed position in control of the delivery of outside air to the chamber, motor means for operating said damper means, means responsive to the wet bulb temperature of the outside air for controlling said motor means to open wide said damper means when the wet bulb temperature is below a predetermined value and to move said damper means to an intermediate position when the wet bulb temperature is above a predetermined value, and means for causing movement of the damper means to a closed position as an incident to stopping of the fan means irrespective of the outside wet bulb temperature.

5. In an air conditioning system for a space, an air conditioning chamber for conditioning air to be delivered to the space, means including fan means for delivering outside air into the chamber and for delivering conditioned air to the space, damper means movable between a wide open position and a closed position in control of the delivery of outside air to the chamber, motor means for operating said damper means, means responsive to the wet bulb temperature of the outside air for controlling said motor means to open wide said damper means when the wet bulb temperature is below a predetermined value and to move said damper means to an intermediate position when the wet bulb temperature is above a predetermined value, means responsive to the relative humidity of the outside air also in control of said motor means to move the damper means to an intermediate position when the relative humidity increases to a predetermined value regardless of the wet bulb temperature of the outside air, and means for causing movement of the damper means to a closed position as an incident to stopping of the fan means irrespective of the outside wet bulb temperature and humidity.

6. In an air conditioning system for a space, an air conditioning chamber for conditioning air to be delivered to the space, means including fan means for delivering outside air into the chamber and for delivering conditioned air to the space, damper means movable between a wide open position and a closed position in control of the delivery of outside air to the chamber, motor means for operating said damper means, means responsive to the wet bulb temperature of the outside air for controlling said motor means to open wide said damper means when the wet bulb temperature is below a predetermined value and to move said damper means to an intermediate position when the wet bulb temperature is above a predetermined value, means responsive to the dry bulb temperature of the outside air also in control of said motor means to move the damper means to an intermediate position when the dry bulb temperature decreases to a predetermined value regardless of the wet bulb temperature of the outside air, and means for causing movement of the damper means to a closed position as an incident to stopping of the fan means irrespective of the outside wet bulb temperature and dry bulb temperature.

7. In an air conditioning system for a space, an air conditioning chamber for conditioning air to be delivered to the space, means including fan means for delivering outside air into the chamber and for delivering conditioned air to the space, damper means movable between a wide open position and a closed position in control of the delivery of outside air to the chamber, motor means for operating said damper means, means responsive to the wet bulb temperature of the outside air for controlling said motor means to open wide said damper means when the wet bulb temperature is below a predetermined value and to move said damper means to an intermediate position when the wet bulb temperature is above a predetermined value, means for causing movement of the damper means to a closed position as an incident to stopping of the fan means irrespective of the outside wet bulb temperature, and adjusting means for determining the intermediate position to which the damper means is moved.

8. In an air conditioning system for a plurality of spaces or zones, an air conditioning chamber for each space for conditioning air to be delivered to its associated space, means including fan means for each chamber for delivering outside air into its associated chamber and for delivering conditioned air to its associated space, damper means for each chamber movable between a wide open position and a closed position in control of the delivery of outside air to its associated chamber, motor means for each damper means for operating the same, means including a single set of control means for controlling all of said motor means, said single set of control means including means responsive to the wet bulb temperature of the outside air to open all of said damper means when the wet bulb temperature is below a predetermined value and to close all of said damper means when the wet bulb temperature is above the predetermined value, and means for closing selectively any of the damper means regardless of the wet bulb temperature of the outside air.

9. In an air conditioning system for a plurality of spaces or zones, an air conditioning chamber for each space for conditioning air to be delivered to its associated space, means including fan means for each chamber for delivering outside air into its associated chamber and for delivering conditioned air to its associated space, damper means for each chamber movable between a wide open position and a closed position in control of the delivery of outside air to its associated chamber, motor means for each damper means for operating the same, means including a single set of control means for controlling all of said motor means, said single set of control means including means responsive to the wet bulb temperature of the outside air to open all of said damper means when the wet bulb temperature is below a predetermined value and to close all of said damper means when the wet bulb temperature is above the predetermined value, and means for causing closing movement of any of the damper means as an incident to stopping of its associated fan means regardless of the wet bulb temperature of the outside air.

10. In an air conditioning system for a plurality of spaces or zones, an air conditioning chamber for each space for conditioning air to be delivered to its associated space, means including fan means for each chamber for delivering outside air into its associated chamber and for delivering conditioned air to its associated space, damper means for each chamber movable between a wide open position and a closed position in control of the delivery of outside air to its associated chamber, motor means for each damper means for operating the same, means including a single set of control means for controlling all of said motor means, said single set of control means including means responsive to the wet bulb temperature of the outside air to open all of said damper means when the wet bulb temperature is below a predetermined value and to close all of said damper means when the wet bulb temperature is above the predetermined value, and means responsive to the dry bulb temperature of the outside air for closing all of the damper means when the dry bulb temperature decreases to a predetermined value regardless of the wet bulb temperature of the outside air.

11. In an air conditioning system, the combination of damper means for controlling the supply of outside air to an enclosure, control means responsive to the dry bulb temperature of the outside air, control means responsive to the relative humidity of the outside air, means for correlating the control functions of the dry bulb temperature responsive control means and the humidity responsive control means in terms of wet bulb temperature, means controlled by said last mentioned means for operating said damper means to a maximum air supplying position when the wet bulb temperature of the outside air is less than a predetermined value and for operating said damper means to a minimum air supplying position when the wet bulb temperature is greater than said predetermined value, and means responsive to a predetermined high relative humidity of the outside air for operating said damper means to a minimum air supplying position regardless of the wet bulb temperature of the outside air.

12. In an air conditioning system, the combination of damper means for controlling the supply of outside air to an enclosure, control means responsive to the dry bulb temperature of the outside air, control means responsive to the relative humidity of the outside air, means for correlating the control functions of the dry bulb temperature responsive control means and the humidity responsive control means in terms of wet bulb temperature, means controlled by said last mentioned means for operating said damper means to a maximum air supplying position when the wet bulb temperature of the outside air is less than a predetermined value and for operating said damper means to a minimum air supplying position when the wet bulb temperature is greater than said predetermined value, and means responsive to a predetermined low dry bulb temperature value of the outside air for operating said damper means to a minimum air supplying position regardless of the wet bulb temperature of the outside air.

13. In an air conditioning system, the combination of damper means for controlling the supply of outside air to an enclosure, control means responsive to the dry bulb temperature of the outside air, control means responsive to the relative humidity of the outside air, means for correlating the control functions of the dry bulb temperature responsive control means and the humidity responsive control means in terms of wet bulb temperature, means controlled by said last mentioned means for operating said damper means to a maximum air supplying position when the wet bulb temperature of the outside air is less than a predetermined value and for operating said damper means to a minimum air supplying position when the wet bulb temperature is greater than said predetermined value, means responsive to a predetermined high relative humidity of the outside air for operating said damper means to a minimum air supplying position regardless of the wet bulb temperature of the outside air, and means responsive to a predetermined low dry bulb temperature value of the outside air for operating said damper means to a minimum air supplying position regardless of the wet bulb temperature of the outside air.

14. In an air conditioning system for a plurality of spaces or zones, an air conditioning chamber for each space for conditioning air to be delivered to its associated space, means including fan means for each chamber for delivering outside air into its associated chamber and for delivering conditioned air to its associated space, damper means for each chamber movable between a wide open position and a closed position in control of the delivery of outside air to its associated chamber, motor means for each damper means for operating the same, means including a single set of control means for controlling all of said motor means, said single set of control means including means responsive to the wet bulb temperature of the outside air to open all of said damper means when the wet bulb temperature is below a predetermined value and to close all of said damper means when the wet bulb temperature is above the predetermined value, and means responsive to the relative humidity of the outside air for closing all of the damper means when the relative humidity increases to a predetermined value regardless of the wet bulb temperature of the outside air.

15. The method of controlling the supply of outside air to an enclosure for air conditioning purposes, comprising the steps of, measuring the dry bulb temperature of the outside air, measuring the relative humidity of the outside air, cumulatively correlating the measurements of the dry bulb temperature and the relative humidity of the outside air in terms of total heat, and decreasing the supply of outside air when the cumulative measurement in terms of total heat of the dry bulb temperature and the relative humidity of the outside air rises above a predetermined value.

16. The method of controlling the supply of outside air to an enclosure for air conditioning purposes, comprising the steps of, measuring within predetermined limits the dry bulb temperature of the outside air, measuring within predetermined limits the relative humidity of the outside air, cumulatively correlating the measurements of the dry bulb temperature and the relative humidity of the outside air within said predetermined limits and in terms of total heat, decreasing the supply of outside air when the cumulative measurement in terms of total heat of the dry bulb temperature and the relative humidity of the outside air rises above a predetermined value within said limits, and decreasing the supply of outside air when the relative humidity of the outside air increases beyond said predetermined limits regardless of the cumulative measurement.

17. The method of controlling the supply of outside air to an enclosure for air conditioning purposes, comprising the steps of, measuring within predetermined limits the dry bulb temperature of the outside air, measuring within predetermined limits the relative humidity of the outside air, cumulatively correlating the measurements of the dry bulb temperature and the relative humidity of the outside air within said predetermined limits and in terms of total heat, decreasing the supply of outside air when the cumulative measurement in terms of total heat of the dry bulb temperature and the relative humidity of the outside air rises above a predetermined value within said limits, and decreasing the supply of outside air when either the relative humidity of the outside air increases beyond or the dry bulb temperature of the outside air decreases beyond said predetermined limits regardless of the cumulative measurement.

JOHN E. HAINES.